Nov. 7, 1933.  L. BLOCH  1,933,839
BATHROOM FIXTURE
Filed May 6, 1931  2 Sheets-Sheet 1
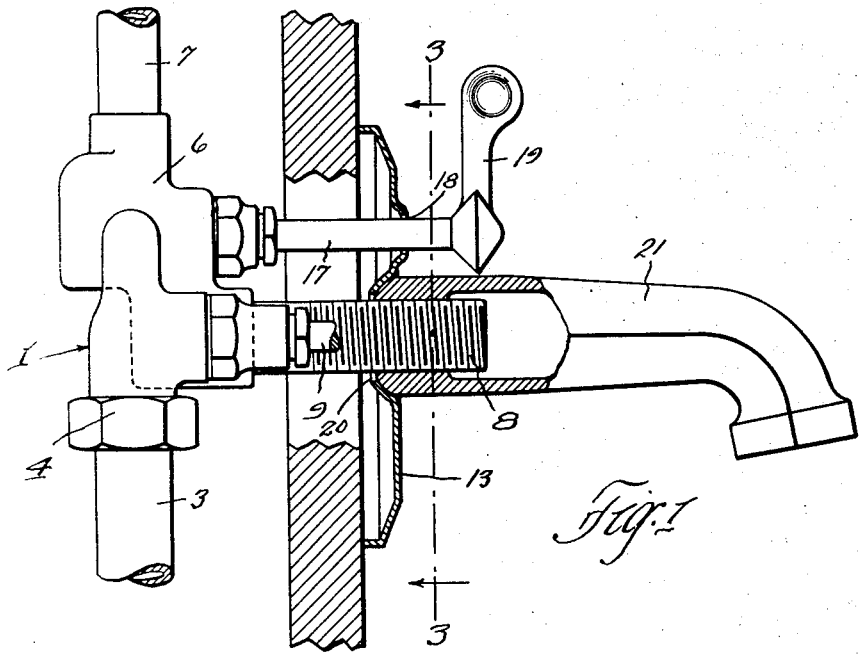
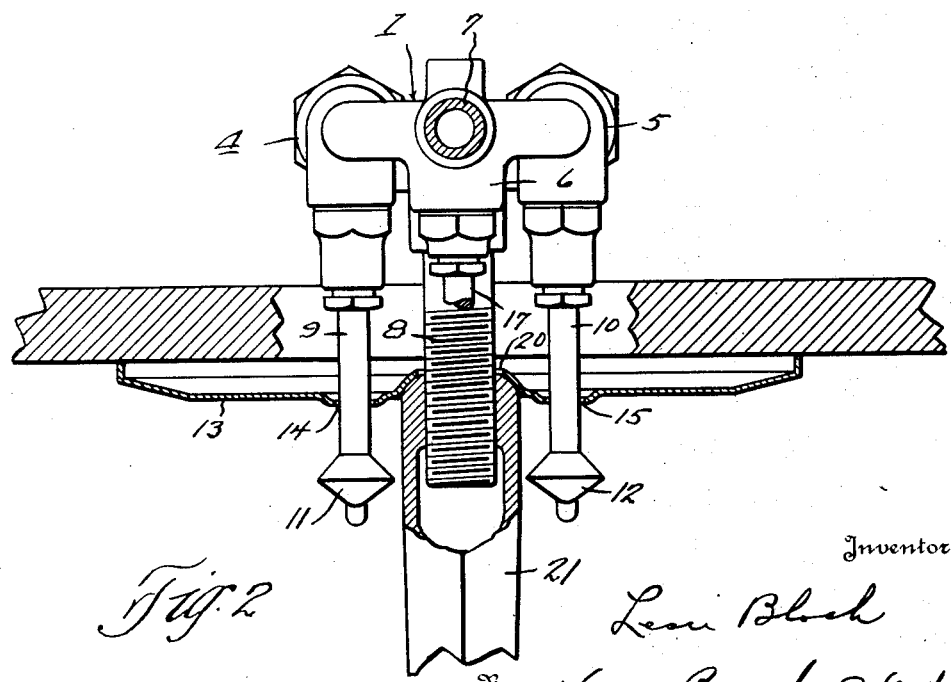

Nov. 7, 1933.  L. BLOCH  1,933,839
BATHROOM FIXTURE
Filed May 6, 1931  2 Sheets-Sheet 2
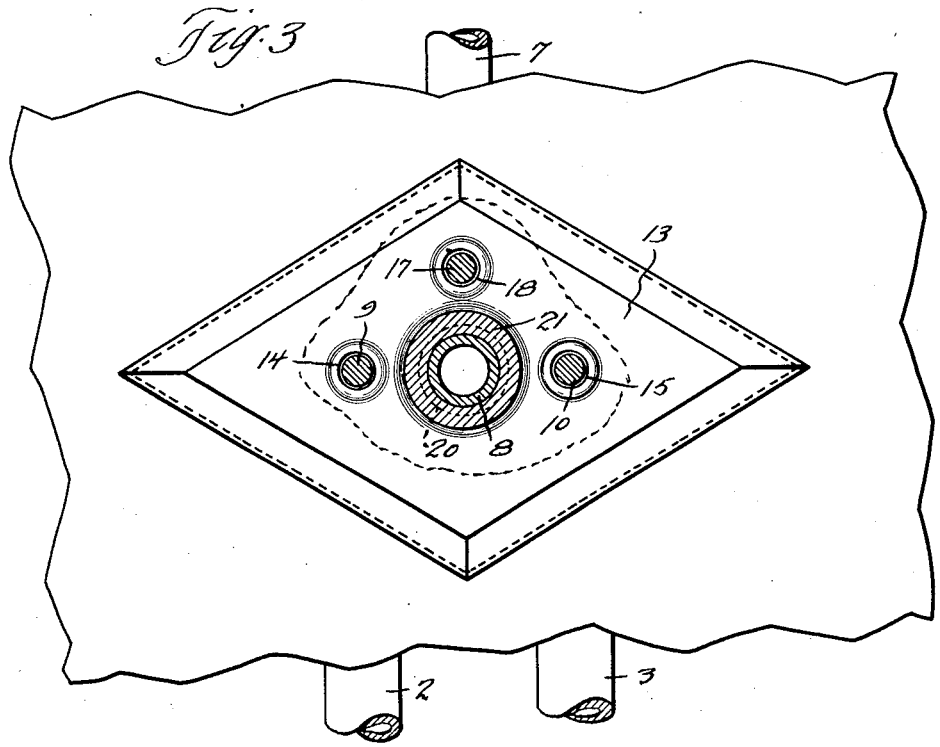
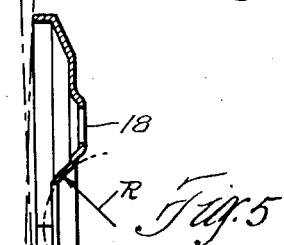
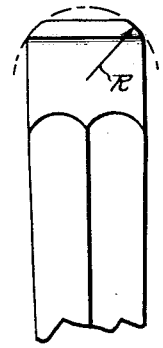
Inventor
Leon Bloch
By Hull, Brock & West
Attorney Patented Nov. 7, 1933

1,933,839

UNITED STATES PATENT OFFICE 1,933,839

BATHROOM FIXTURE

Leon Bloch, Cleveland Heights, Ohio

Application May 6, 1931. Serial No. 535,482

7 Claims. (Cl. 137—111)

This invention relates to a bathroom fixture which is particularly adapted for use in the modern bathroom where the pipes controlling the supply of hot and cold water are disposed behind the wall structure and has particular reference to a fixture or unit for controlling the supply of hot and cold water to the bathtub.

The main object of the invention is to provide a bathroom fixture for controlling the supply of hot and cold water to the bathtub which may be arranged behind the wall structure and which is covered by a single escutcheon plate which is held in place by means of the spout through which the water is delivered to the bathtub.

A further object of the invention is to provide a bathroom unit of the character described which consists of few parts and which is well adapted for production at very low cost.

A still further object of the invention is to provide an escutcheon plate which is adapted for use with a unit of the character described and which is formed of a single piece of material and which is also so constructed as to allow for irregularities in the wall structure.

Further and more limited objects of the invention will appear as the description proceeds and by reference to the accompanying drawings in which Fig. 1 is a fragmentary vertical sectional view disclosing my unit secured to the wall structure; Fig. 2 is a fragmentary horizontal sectional view of the unit disclosed in Fig. 1; Fig. 3 is a fragmentary view in front elevation approximately on the line 3—3 of Fig. 1; Fig. 4 is a horizontal sectional view of the escutcheon plate; Fig. 5 is a vertical sectional view of the escutcheon plate and Fig. 6 is a fragmentary top plan view of the spout.

Referring now to the drawings, the bathroom fixture comprises a unit arranged behind the wall structure and consisting of a valve casing 1 which is disposed behind the wall structure and mounted on and carried by the hot and cold water supply pipes 2 and 3. Arranged within the valve casing at the points indicated by numerals 4 and 5 are hot and cold water control valves. Also arranged within the casing at the point 6 is a diverter valve from which leads a pipe 7 which is connected with the overhead shower. Leading from the valve casing 1, and detachably connected therewith, is a pipe or connection 8 which is exteriorly threaded and projects a considerable distance through an opening in the wall structure. Leading from the valves 4 and 5 are valve stems 9 and 10 to the outer ends of which are connected operating handles 11 and 12.

Secured over the opening in the wall structure is an escutcheon plate 13 shown in detail in Figs. 3, 4 and 5. The escutcheon plate is provided with openings 14 and 15 through which the valve operating stems 9 and 10 project. The diverter valve stem 17 projects through an opening 18 provided in the escutcheon plate 13 and is provided with an operating handle 19. The escutcheon plate is also provided with a circular opening 20 through which the pipe or connection 8 projects. The escutcheon plate is provided about the opening 20 with an inwardly deflected portion which is annular in shape and formed on the radius R as indicated in Figs. 4 and 5. The escutcheon plate is secured in place by means of the spout 21, the inner end of which is rounded and is also formed on the same radius R. The spout 21 is threadedly secured over the exteriorly threaded pipe or connection 8 and the rounded end thereof fits into the depressed central portion of the escutcheon plate. This construction provides a sort of ball and socket connection which allows for irregularities in the wall line.

The advantages of this construction are illustrated in Figs. 4 and 5. In Fig. 4 irregular wall lines are indicated by dot and dash lines A, A and B, B. In Fig. 5 irregular wall lines are indicated by the lines C, C and D, D. Irregular or angular wall lines frequently occur due to variations in thickness of the tiles.

With the construction just described, the spout can be tightened and the escutcheon plate forced into engagement with the wall, even though the wall line may be quite irregular. This will also allow for imperfect or warped escutcheon plates.

It will be seen, from the construction just described that the escutcheon plate is held in place solely by means of the spout. The hot and cold water is supplied to the unit through the pipes 2 and 3 which are controlled by the valves 4 and 5. The valve handles 11 and 12 are operated to properly proportion the mixture of hot and cold water. The diverter valve which is operated by the valve handle 19 diverts the flow of water to either the pipe 7 or the spout 21. By moving the valve handle 19, the water may be diverted to either the tub or the shower.

Attention is called to the fact that the unit as a whole is quite simple and compact and comprises a minimum number of parts, which necessarily reduces the cost of production materially. By securing the escutcheon plate in place, by means of the spout a material saving is made. It should also be pointed out that due to the fact that the pipe or connection 8 is of considerable length, the unit is adapted for use with walls of varying thickness.

The embodiment of the invention herein disclosed is merely illustrative and is not to be considered in a limiting sense as various changes may be made in the details of construction as well as in the manner of securing the various parts in place without departing from the spirit of my invention. The invention is therefore limited only in accordance with the scope of the appended claims.

Having thus described my invention, what I claim is:

1. A bathroom fixture comprising a water control unit arranged behind a wall structure and containing valves for controlling the delivery of water and having a connection leading through the wall, an escutcheon plate carried by said connection, a spout detachably secured to said connection and securing said escutcheon plate in place, the valve operating means for said unit extending through said escutcheon plate and being operable from the exterior thereof.

2. A bathroom fixture comprising a water control unit arranged behind a wall structure and containing valves for controlling the delivery of water and having a connection leading through the wall, an escutcheon plate carried by said connection, a spout detachably secured to said connection and securing said escutcheon plate in place, the valve operating means for said unit extending through said escutcheon plate and being operable from the exterior thereof, there being a ball and socket connection between said spout and escutcheon plate to allow for irregularities in the wall structure.

3. A bathroom fixture for controlling the delivery of hot and cold water to a bathtub comprising a unit adapted to be disposed behind the wall structure, and containing valves for controlling the supply of hot and cold water, an escutcheon plate, a connection leading from said unit through which water is delivered to said tub, a spout adjustably secured to said connection and serving to secure said escutcheon plate in place, the valve operating means also extending through said escutcheon plate and being operable from the exterior thereof.

4. A bathroom fixture for controlling the delivery of hot and cold water to a bathtub comprising a unit adapted to be disposed behind the wall structure, and containing valves for controlling the supply of hot and cold water, an escutcheon plate, a connection leading from said unit through which water is delivered to said tub, a spout adjustably secured to said connection and serving to secure said escutcheon plate in place, the valve operating means also extending through said escutcheon plate and being operable from the exterior thereof, and cooperating means on said escutcheon plate and spout for allowing for irregularities in the wall structure.

5. A bathroom fixture for controlling the delivery of hot and cold water to a bathtub comprising a unit adapted to be disposed behind the wall structure, and containing valves for controlling the supply of hot and cold water, an escutcheon plate, a connection leading from said unit through which water is delivered to said tub, a spout adjustably secured to said connection and serving to secure said escutcheon plate in place, the valve operating means also extending through said escutcheon plate and being operable from the exterior thereof, and cooperating means on said escutcheon plate and spout for allowing for irregularities in the wall structure, said spout constituting the sole means for securing said escutcheon plate.

6. A bathroom fixture for controlling the delivery of hot and cold water to a bathtub comprising a unit adapted to be arranged behind an opening in the wall structure, a single escutcheon plate covering the said opening and unit and through which the valve operating means project, and a spout securing said escutcheon plate in place.

7. A bathroom fixture comprising a water control unit arranged behind the wall structure of a bathroom and adapted to control the delivery of hot and cold water, a single escutcheon plate covering said unit and through which the valve operating means project, a spout detachably secured to said unit and constituting the sole means for securing said escutcheon plate in place.

LEON BLOCH.